United States Patent
Tsaur et al.

(10) Patent No.: US 10,133,820 B2
(45) Date of Patent: Nov. 20, 2018

(54) TECHNIQUES FOR PERFORMING INTELLIGENT CONTENT INDEXING

(75) Inventors: Ynn-Pyng Tsaur, Oviedo, FL (US); Troy Cochran, Orlando, FL (US)

(73) Assignee: Veritas Technologies LLC, Mountain View, CA (US)

( * ) Notice: Subject to any disclaimer, the term of this patent is extended or adjusted under 35 U.S.C. 154(b) by 1959 days.

(21) Appl. No.: 11/771,507

(22) Filed: Jun. 29, 2007

(65) Prior Publication Data

US 2009/0006535 A1 Jan. 1, 2009

(51) Int. Cl.
*G06F 17/30* (2006.01)
*G06F 11/14* (2006.01)

(52) U.S. Cl.
CPC .... *G06F 17/30864* (2013.01); *G06F 11/1448* (2013.01); *G06F 11/1464* (2013.01)

(58) Field of Classification Search
CPC ................................................ G06F 17/30864
USPC .................................. 707/696, 999.204, 741
See application file for complete search history.

(56) References Cited

U.S. PATENT DOCUMENTS

| | | | |
|---|---|---|---|
| 6,615,224 B1 * | 9/2003 | Davis ........................... | 707/610 |
| 7,007,067 B1 * | 2/2006 | Azvine et al. ................ | 709/206 |
| 7,330,997 B1 * | 2/2008 | Odom ........................... | 714/6.23 |
| 7,587,398 B1 * | 9/2009 | Fredricksen ...... | G06F 17/30899 |
| 2002/0083053 A1 * | 6/2002 | Richard et al. .................... | 707/3 |
| 2004/0167939 A1 * | 8/2004 | Margolus .......... | G06F 17/30368 |
| 2005/0166082 A1 | 7/2005 | Williams et al. | |
| 2006/0235878 A1 | 10/2006 | Shipp et al. | |
| 2007/0043715 A1 * | 2/2007 | Kaushik et al. .................. | 707/4 |
| 2007/0100913 A1 * | 5/2007 | Sumner et al. ............... | 707/204 |
| 2007/0288490 A1 * | 12/2007 | Longshaw ..................... | 707/100 |
| 2008/0028009 A1 * | 1/2008 | Ngo .............................. | 707/204 |
| 2008/0071908 A1 * | 3/2008 | Nair et al. ..................... | 709/226 |

FOREIGN PATENT DOCUMENTS

| | | |
|---|---|---|
| EP | 1 217 543 | 6/2002 |
| EP | 1217542 | 6/2002 |
| JP | 2005141319 A | 6/2005 |
| JP | 2007156844 A | 6/2007 |
| WO | WO-05/069783 | 8/2005 |
| WO | WO 2007/021842 | 2/2007 |
| WO | WO-08/039513 | 4/2008 |

OTHER PUBLICATIONS

European Patent Office Search Report and Annex on European Application No. 08159366.7-1527 / 2009561, dated Dec. 17, 2008.

* cited by examiner

*Primary Examiner* — Kimberly Wilson
(74) *Attorney, Agent, or Firm* — Patent Law Works LLP

(57) ABSTRACT

Techniques for intelligent content indexing are disclosed. In one particular exemplary embodiment, the techniques may be realized as a method for performing intelligent content indexing comprising indexing by one or more processes associated with a client an initial full set of data of the client to create an index of the client data, detecting a change in the client data, and modifying the index to reflect the change in the client data.

16 Claims, 7 Drawing Sheets

TECHNIQUES FOR PERFORMING INTELLIGENT CONTENT INDEXING

FIELD OF THE DISCLOSURE

The present disclosure relates generally to data storage systems and, more particularly, to techniques for performing intelligent content indexing.

BACKGROUND OF THE DISCLOSURE

Typical enterprise computing environments consist of hundreds to thousands of client machines. Client machines may include desktops, laptops, servers and other computing devices. With such a large number of client machines, a huge amount of data is required to be protected. Additionally, new compliance regulations exist which may require the maintenance of data for long periods of time. This results in an exponential growth of historical data which is protected and managed by shared protection servers. In order to provide the ability to locate the historical data based upon content of the data, content indexing technology is often utilized.

Traditionally, content indexing is achieved by backing up data to a shared protection server and scanning backed up data on the shared protection server to create a central content index. However, content indexing is a very processor and memory intensive operation. This operation must be carried out for every backup image received for each client. Additionally, storage space for indexes of the backed up data is significant.

In view of the foregoing, it may be understood that there may be significant problems and shortcomings associated with current methods of indexing backup data.

SUMMARY OF THE DISCLOSURE

Techniques for intelligent content indexing are disclosed. In one particular exemplary embodiment, the techniques may be realized as a method for performing intelligent content indexing comprising indexing by one or more processes associated with a client an initial full set of data of the client to create an index of the client data, detecting a change in the client data, and modifying the index to reflect the change in the client data.

In another particular exemplary embodiment, the techniques may be realized by a system for performing intelligent content indexing comprising an index engine associated with a client configured to index an initial full set of data of the client to create an index of the client data, detect a change in the client data, and modify the index to reflect the change in the client data.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
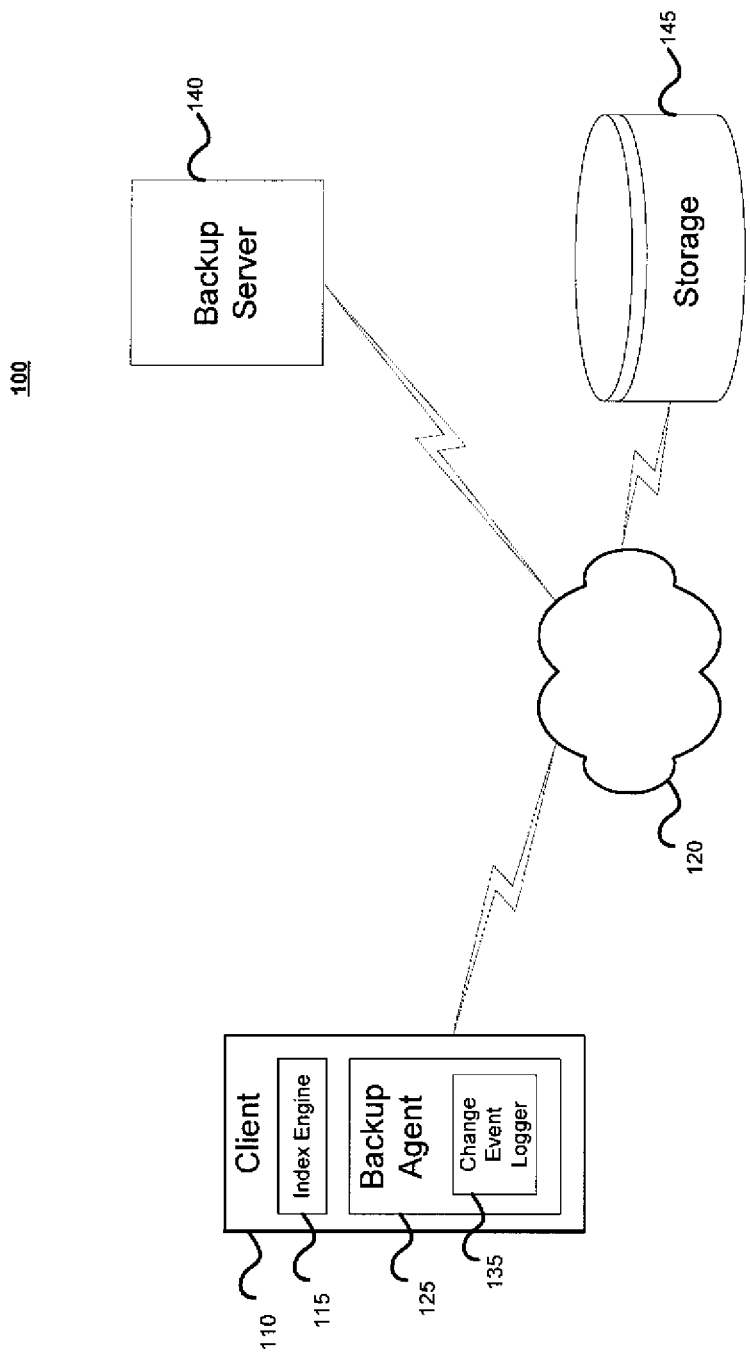
FIG. 1 shows a system of intelligent content indexing in accordance with an embodiment of the present disclosure.

Referring to FIG. 1, there is shown a system 100 of intelligent content indexing in accordance with an embodiment of the present disclosure. Client 110 may represent a computing device containing index engine 115 and backup agent 125 and operatively connected to network 120. Backup agent 125 may contain change event logger 135. In one or more embodiments, backup agent 125 may be a separate computing device. Backup server 140 may be operatively connected to network 120 and may manage backup operations for one or more clients on network 120. Backup server 140 may utilize storage 145 for backup storage. Storage 145 may be a storage area network, a raid array, a tape drive, a disk drive or other storage device.

Client 110 may index live data using index engine 115. Live data may represent the current data of client 110. In some embodiments, index engine 115 may be contained on a machine separate from client 110, such as an index server. Index engine 115 may create an initial index which may contain the data to be backed up from client 110. Index engine 115 may then increment the index for one or more changes detected in the data of client 110. Client 110 may contain one or more of the indexes.

Backup images may be sent to backup server 140 by backup agent 125. The backup images may contain the one or more indexes which may correspond to data of client 110. Backup server 140 may store one or more images containing the backed up data on storage 145.

Change event logger 135 may detect changes in client data of client 110 and may record changes to a log file or other storage. Index engine 115 may index incremental changes in data after an initial full index is produced independently of a backup strategy. For example, index engine 115 may index only changes in data of a client even if a client backup strategy requires a full backup. Index engine 115 may index only incremental changes to client data and it may do so by maintaining single index or multiple copies of a single index and may thus maintain a complete index of the client 110's data. An index contained on client 110 may contain historical data. For example, an index on client 110 may contain metadata about a file that may have been previously deleted. In one or more embodiments, index engine 115 may index backup image data and may use records of changes to produce one or more indexes. These one or more indexes may be maintained by modifying the one or more indexes to indicate only changes in live data of a client since the previous backup image data was indexed.

Index engine 115 may reduce the storage size of indexes and increase the efficiency of indexing. Instead of indexing a entire backup image everytime an image is received, index engine 115 may generate a single index that represents the live or current data of the client as well as historical entries. It may do so by detecting requests by a client to add, update or delete its data and by recording only the resulting change to the data. Thus, index engine 115 may clearly differentiate the delta or change in the data and may avoid indexing an entire set of client data. By creating an initial full index and incrementing the index each time a change to client data occurs, index engine 115 may maintain a chronological record of data changes. A resulting index may contain metadata about files which may be useful to a search request and may enable a file no longer in live data of a client to be located in backup data for the client. Index engine 115 with its capability of indexing live data and its ability to be located on a client machine may significantly reduce load on a centralized backup server.

Figure 2:
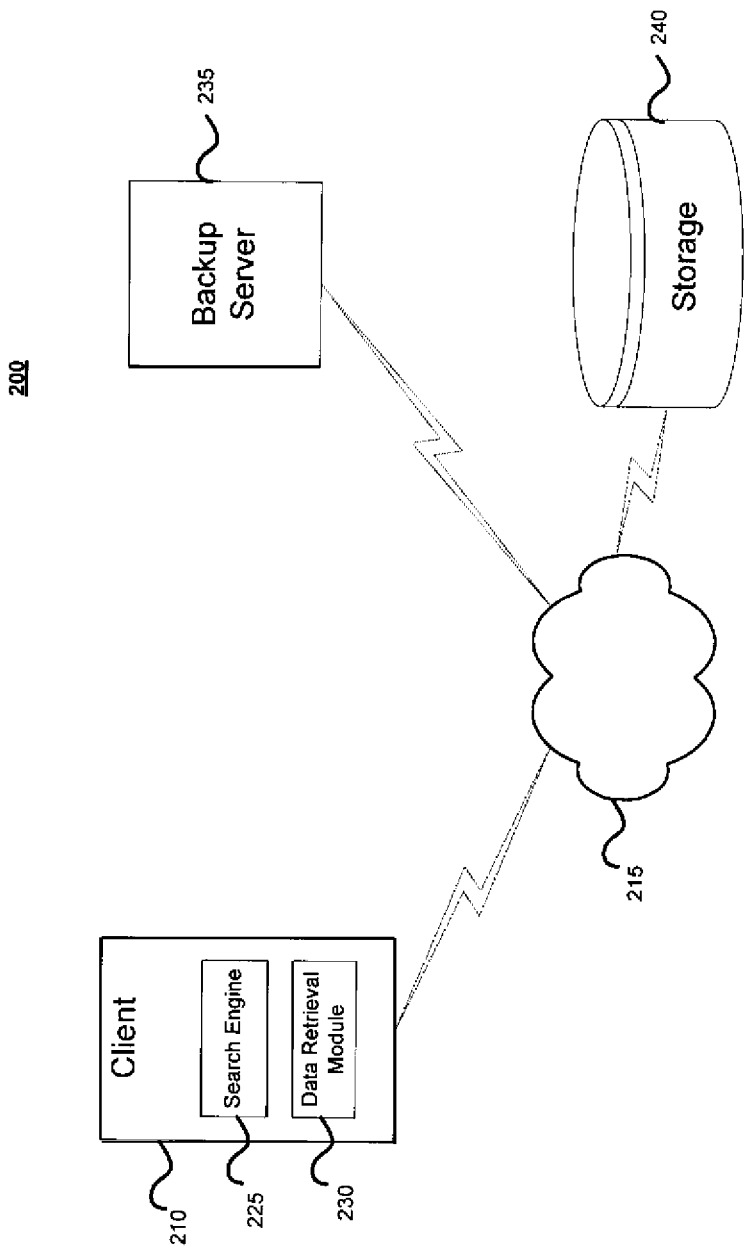
FIG. 2 shows a system of intelligent content indexing in accordance with an alternative embodiment of the present disclosure.

Referring to FIG. 2, there is shown a system 200 of intelligent content indexing in accordance with an alternative embodiment of the present disclosure. Client 210 may represent a client, operatively connected to network 215, that is seeking data from within the intelligent content indexing system 200. Client 210 may contain search engine 225 and data retrieval module 230 and may be connected to network 215. In some embodiments, search engine 225 and/or data retrieval module 230 may be located on a separate machine from client 210. In one or more embodiments, search engine 225 and/or data retrieval module 230 may be located on an index server. Client 210 may send a query utilizing search engine 225. Search engine 225 may search one or more indexes and may locate data corresponding to the search request. Search engine 225 may return the results to client 210. Client 210 may request data indicated by one or more search results from data retrieval module 230. Data retrieval module 230 may retrieve data from a local machine (i.e., storage of client 210). Data retrieval module 230 may also send a request to backup server 235 for data from one or more backups. Data retrieval module 230 may receive data from one or more backups which may be on storage 240. Data retrieval module 230 may return the requested data to client 210.

Figure 3:
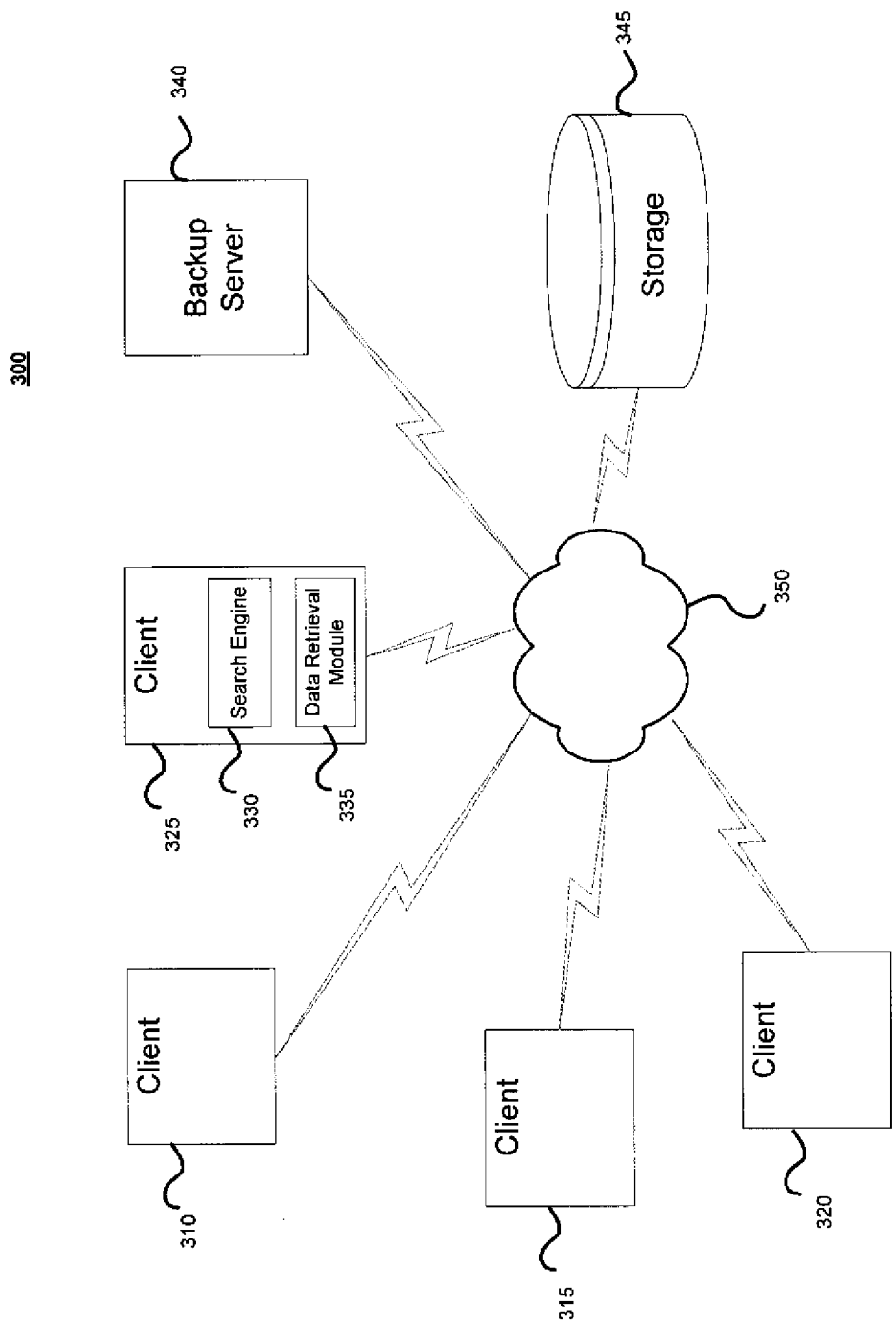
FIG. 3 shows a system of intelligent content indexing in accordance with another alternative embodiment of the present disclosure.

Referring to FIG. 3, there is shown a system 300 of intelligent content indexing in accordance with another alternative embodiment of the present disclosure. In one or more embodiments, the intelligent content indexing system 300 may permit distributed searching of one or more indexes of one or more clients. For example, client 325 may send a search request utilizing search engine 330. Search engine 330 may represent a federated search engine and may send a request to search engines contained on clients 310, 315 and 320. Search engine 330 may also search a local index which may index data of client 325. Data may be received from search engines searching indexes of client 310, 315 and 325. However, search engine 330 may detect that no data has been received from client 320. For example, a search request to client 320 may time out because client 320 may be down, offline or inaccessible for other reasons. Search engine 330 may then send a query to backup server 340 for an image from storage 345 which may represent the last backup of client 320. Backup server 340 may resolve the location of the last known image of client 320. The resolving process may utilize determining a time of a backup, whether a backup has been archived, moved, copied or other factors. Backup server 340 may obtain the backup image from storage 345 and may mount the appropriate backup image for client 320. Backup server 340 may start a search engine process on the backup server which may search an index contained in the backup image for the requested data. Search engine 330 may receive the results of the searches for clients 310, 315 and 325. Search engine 330 may also receive the search results from client 320 from backup server 340. Data retrieval module 335 may retrieve data which may be subsequently requested by client 325. Data retrieval module 335 may retrieve live data from one or more clients and may retrieve data from one or more backups. Clients 310, 315, 320, 325, backup server 340 and storage 345 may be operatively connected to network 350.

Figure 4:
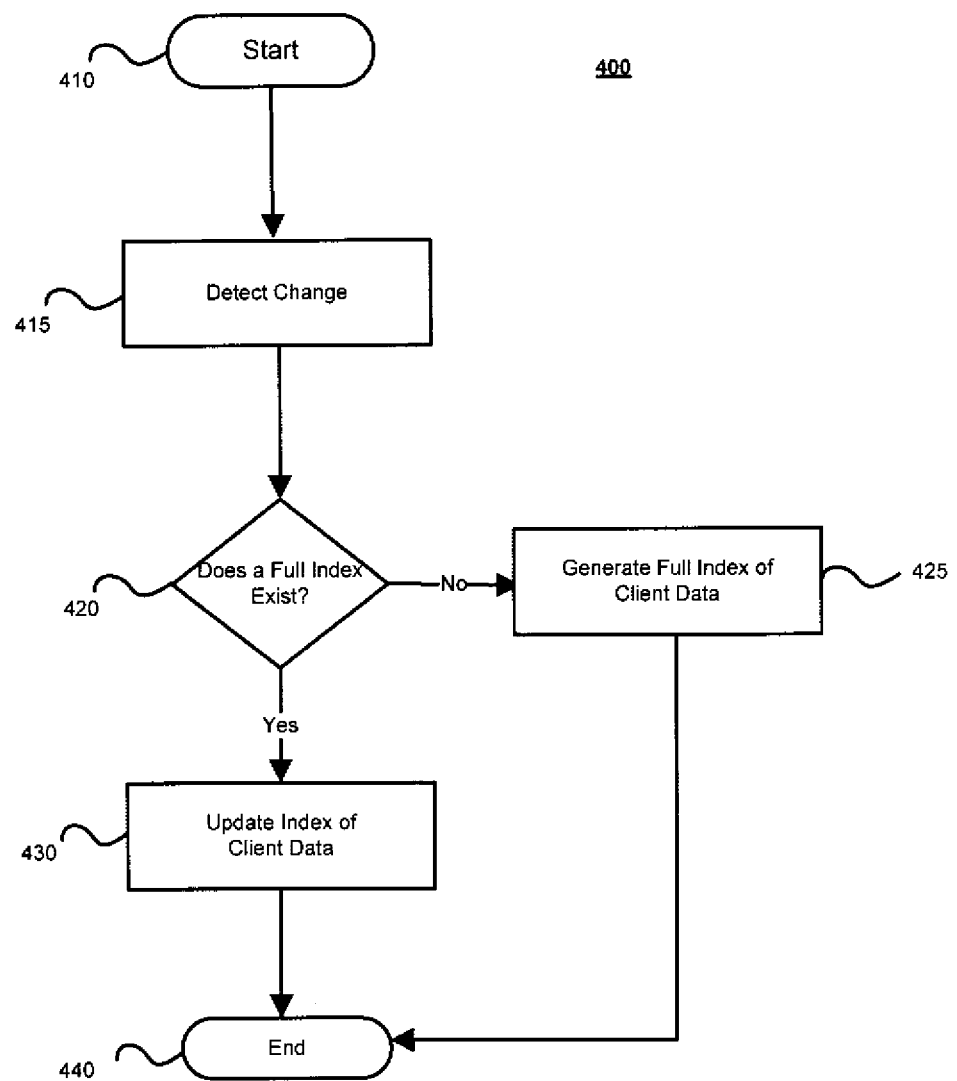
FIG. 4 shows a method of intelligent content indexing in accordance with an embodiment of the present disclosure.

Referring to FIG. 4, there is shown a method 400 of intelligent content indexing in accordance with an embodiment of the present disclosure. Method 400 may start at block 410. At block 415, the method may detect one or more changes in data of a client. At block 420, the method may determine whether an initial full index of a client exists. If not, the method may continue at block 425 where an initial full index of the client may be generated. In other embodiments, as soon as an indexing process is started, the process may generate an initial full index. The initial full index of the client may be generated by an index engine which may index live data on the client. In some embodiments, the index engine may index backup images of a client. The method may end at block 440. If at block 420, the method determines that an initial full index of a client exists, the method may proceed from block 420 to block 430. At block 430, the method may update or modify one or more existing indexes to represent one or more changes in live data of the client that have occurred since the last index update or modification. At block 440, the method may end.

Figure 5:
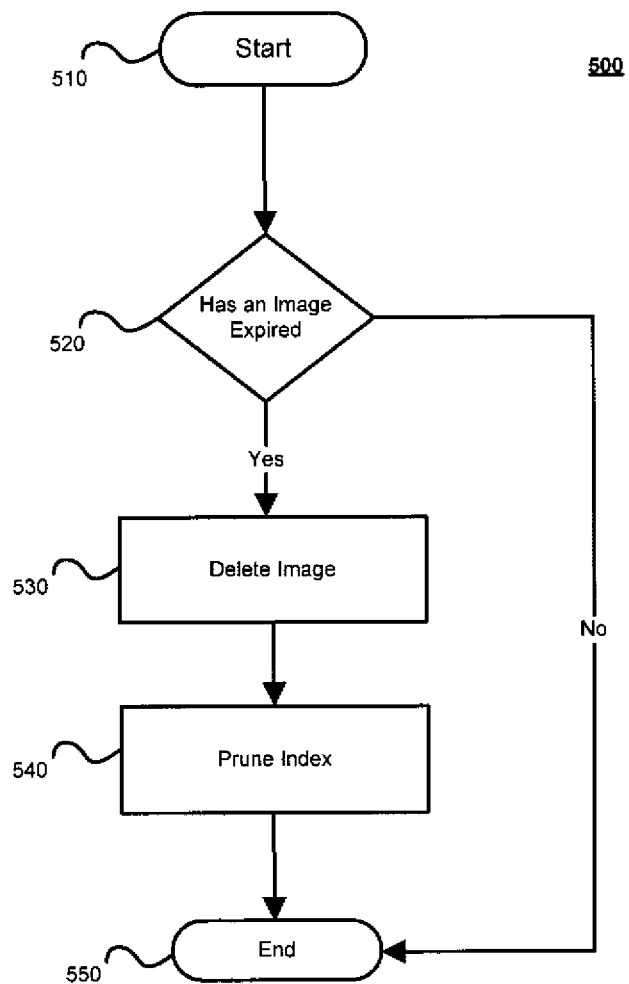
FIG. 5 shows a method of intelligent content indexing in accordance with an alternative embodiment of the present disclosure.

Referring to FIG. 5, there is shown a method 500 of intelligent content indexing in accordance with an alternative embodiment of the present disclosure. Method 500 may start at block 510. At block 520, the method may detect whether any images stored for backup have expired. For example, a backup image may be required by policy, law or procedure to be stored for a certain period of time. Images stored beyond this time period may be detected by the method at block 520. At block 530, expired images may be deleted. At block 540, one or more indexes referring to a deleted stored image may be pruned and/or updated. This may remove one or more index records referring to the deleted images. At block 550, the method may end. This method 500 may reduce the size of stored backup images and stored indexes. Furthermore, this method 500 may increase the efficiency and accuracy of indexes using the images.

Figure 6:
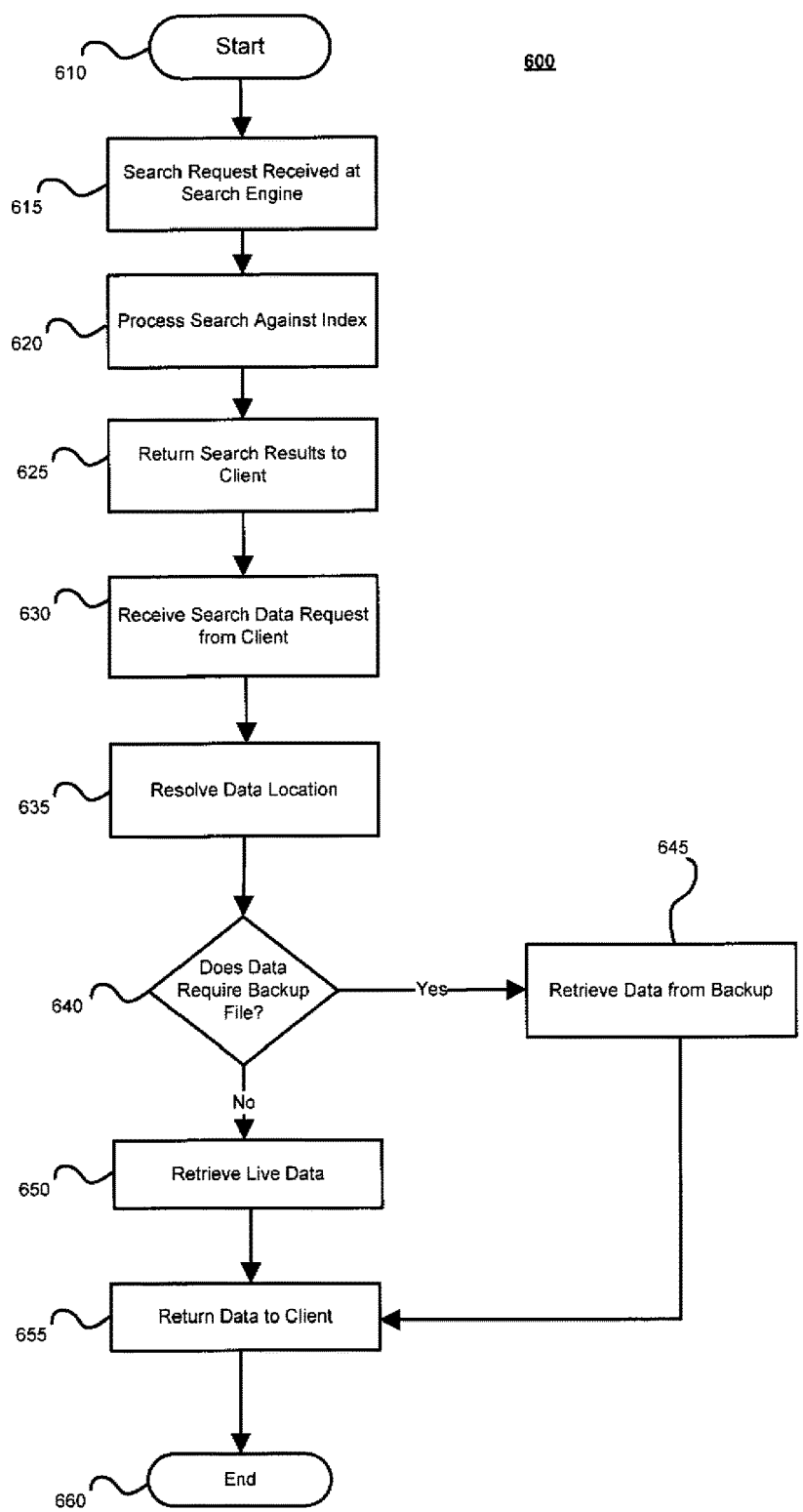
FIG. 6 shows a method of intelligent content indexing in accordance with another alternative embodiment of the present disclosure.

Referring to FIG. 6, there is shown a method 600 of intelligent content indexing in accordance with another alternative embodiment of the present disclosure. Method 600 may begin at block 610. At block 615, a search request may be received at a search engine. At block 620, the search request may be processed against an index for the client being searched. At block 625, search results may be returned to searching client. At block 630, a request for data indicated by the search results may be received from a searching client. At block 635, the location of the data may be resolved. In some embodiments, the location of the data may be resolved using metadata obtained from the index which may provide a filename, file size, one or more timestamps, file locations and other attributes. At block 640, the method may determine whether data is required from a backup. If data is required from a backup, the method may continue at block 645. At block 645, the data may be retrieved from a backup. If at block 640 it is determined that backup data is not needed, the method may continue at block 650. At block 650, the method may retrieve live data of one or more clients being searched. At block 655, the data may be returned to the searching client. At block 660, the method may end.

Figure 7:
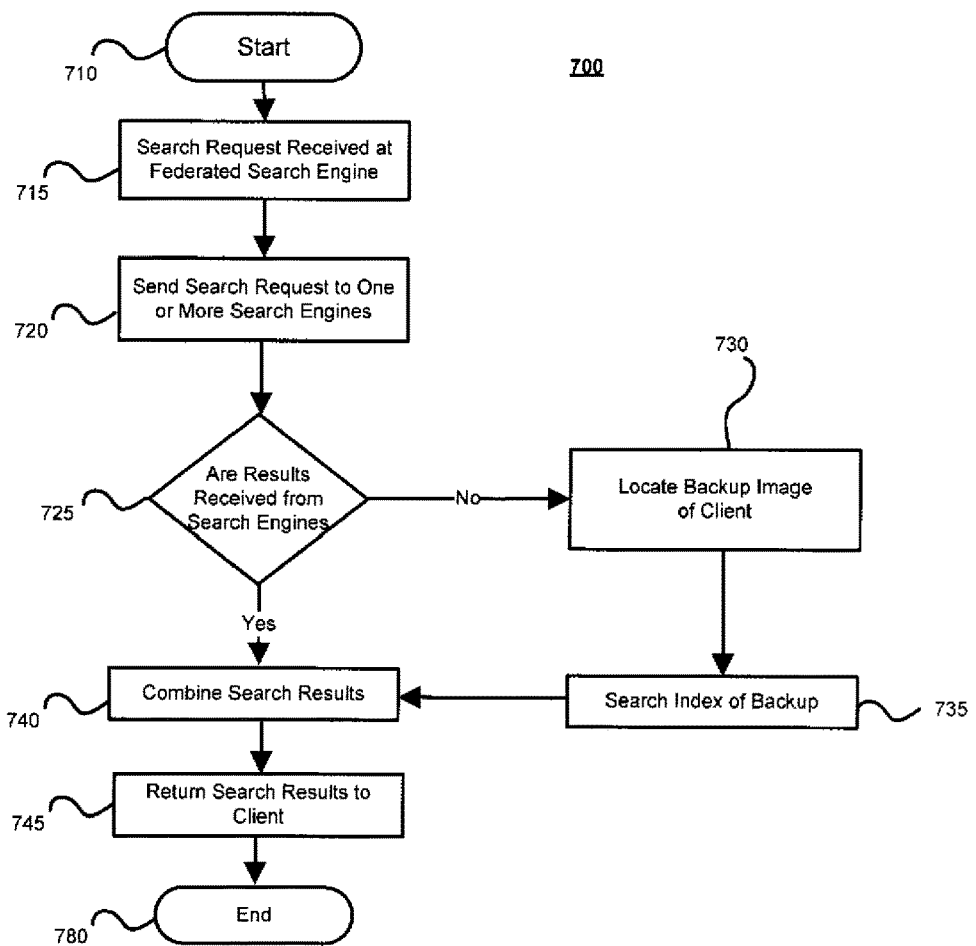
FIG. 7 shows a method of intelligent content indexing in accordance with another alternative embodiment of the present disclosure.

Referring to FIG. 7, there is shown a method 700 of intelligent content indexing in accordance with another alternative embodiment of the present disclosure. Method 700 may begin at block 710. At block 715, a search request may be received at a search engine capable of federating or distributing searches to one or more additional search engines. The one or more search engines may be located on one or more clients and may search indexes associated with data of the one or more respective clients. The one or more search engines may be located on index servers or backup servers and may search backup images of clients. The federated search engine may send the search request to one or more search engines at block 720. At block 725, the method may determine whether results have been received from one or more search engines. If one or more search engines have not returned results, the method may continue at block 730. If one or more search engines have returned results, the method may continue at block 740. At block 730, a backup image may be located for one or more clients associated with search engines for which results have not been returned. At block 735, the index of the backup image may be searched. The index of a backup image may be searched by a backup server or other device mounting a retrieved backup image corresponding to the desired client and running a search process against that mounted image. At block 740, the search results from one or more search engines may be combined by the federated search engine. At block 745, the search results may be returned to the client. At block 780, the method may end.

At this point it should be noted that intelligent content indexing in accordance with the present disclosure as described above typically involves the processing of input data and the generation of output data to some extent. This input data processing and output data generation may be implemented in hardware or software. For example, specific electronic components may be employed in an intelligent content indexing system or similar or related circuitry for implementing the functions associated with intelligent content indexing in accordance with the present disclosure as described above. Alternatively, one or more processors operating in accordance with stored instructions may implement the functions associated with intelligent content indexing in accordance with the present disclosure as described above. If such is the case, it is within the scope of the present disclosure that such instructions may be stored on one or more processor readable carriers (e.g., a magnetic disk or other storage medium), or transmitted to one or more processors via one or more signals.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for performing intelligent content indexing comprising:

indexing, using an index engine running on a client separate from a backup server, an initial full set of client data including a plurality of files to create an index of the client data, wherein the index is created on the client and the index is contained on the client, and wherein indexing on the client reduces a load on the backup server;

detecting a change in the client data;

modifying the index, to reflect the change in the client data stored locally on the client and historical client data stored remotely from the client, wherein the index references the current client data stored locally on the client and the historical client data comprises metadata for data deleted on the client device but stored remotely from the client, and wherein the metadata for the historical client data is indexed by modifying the index on the client to indicate that a portion of indexed current client data is historical client data stored remotely from the client in response to deletion of the portion of indexed current client data stored locally on the client is detected;

detecting expiration of a portion of the historical client data stored remotely from the client;

deleting the portion of expired historical client data stored remotely from the client;

updating the index on the client, using the one or more processes on the client, to remove a record referencing the portion of expired historical client data; and providing the index for searching for backup data.

2. The method of claim 1, further comprising:

storing the index and possibly one or more other indexes with one or more backup images.

3. The method of claim 1, wherein the client data is live data of the client and indexing is performed on the live client data.

4. The method of claim 1, wherein the historical client data comprises one or more backup images of the client.

5. The method of claim 1, further comprising: receiving a search request at a search engine from the client; processing the search request against the index; and returning one or more search results to the client.

6. The method of claim 5, further comprising:

receiving a request for data associated with the search results from the client;

resolving a location of the data;

retrieving the data from the location; and returning the data to the client.

7. The method of claim 6, wherein resolving the data location comprises determining whether to retrieve live data from the client or to retrieve data from a backup image of the client.

8. The method of claim 6, wherein resolving the data location comprises determining a location of the data on a backup image of the client.

9. The method of claim 1, further comprising:
receiving a search request at a federated search engine from the client;
sending the search request to one or more search engines;
processing the search request by the one or more search engines against one or more indexes of data, possibly including the index
determining whether one or more search engines has failed to respond to the search request;
locating a backup image for the one or more non-responsive search engines;
searching an index of the backup image of the one or more non-responsive search engines; and
returning one or more search results to the client.

10. The method of claim 9, further comprising:
receiving a request for data associated with the search results from the client;
resolving a location of the data;
retrieving the data from the location; and
returning the data to the client.

11. The method of claim 10, wherein retrieving the data includes one of:
retrieving live data from the location when the data is stored on the client or another client; and
retrieving backup data from the location when the data is not stored on the client or another client.

12. A system for performing intelligent content indexing comprising:
an index engine, including at least one computer processor, associated with a client separate from a backup server, the index server configured to:
index, using on the client, an initial full set of client data including a plurality of files to create an index of the client data, wherein the index is created on the client to generate the index and the index is contained on the client, and wherein indexing on the client reduces a load on a backup server;
detect a change in the client data;
modify the index, to reflect the change in the client data stored locally on the client and historical client data stored remotely from the client, wherein the index references the current client data stored locally on the client and the historical client data comprises metadata for data deleted on the client device but stored remotely from the client, and wherein historical client data is indexed by modifying the index on the client to indicate that a portion of indexed current client data is historical client data stored remotely from the client when deletion of the portion of indexed current client data stored locally on the client is detected;
detect expiration of a portion of the historical client data stored remotely from the client;
delete the portion of expired historical client data stored remotely from the client;
update the index on the client, using the one or more processes on the client, to remove a record referencing the portion of expired historical client data: and
provide the index for searching for backup data.

13. The system of claim 12, wherein the index engine resides on the client.

14. The system of claim 12, wherein indexing is performed on live data of the client.

15. The system of claim 12, further comprising: a federated search engine configured to:
receive a search request from the client;
send the search request to one or more search engines;
determine whether the one or more search engines have failed to respond to the search request;
locate a backup image for the one or more non-responsive search engines;
search an index of the backup image of the one or more non-responsive search engines; and
return one or more search results to the client.

16. An article of manufacture for performing intelligent content indexing, the article of manufacture comprising:
at least one non-transitory processor readable medium; and
instructions stored on the at least one medium
wherein the instructions are configured to be readable from the at least one medium by at least one processor and thereby cause the at least one processor to operate so as to:
index, using one or more processes on a client, an initial full set of client data including a plurality of files to create an index of the client data, wherein the index is created on the client and the index is contained on the client, and wherein indexing on the client reduces a load on a backup server;
detect a change in the client data;
modify the index, using the one or more processes on the client, to reflect the change in the client data, wherein the client data comprises current client data stored locally on the client and historical client data stored remotely from the client, wherein the index references the current client data stored locally on the client and the historical client data stored remotely from the client, and wherein historical client data is indexed by modifying the index on the client to indicate that a portion of indexed current client data is historical client data comprises metadata for data deleted on the client device but stored remotely from the client when deletion of the portion of indexed current client data stored locally on the client is detected;
detect expiration of a portion of the historical client data stored remotely from the client;
delete the portion of expired historical client data stored remotely from the client;
update the index on the client, using the one or more processes on the client, to remove a record referencing the portion of expired historical client data; and
provide the index for searching for backup data.

* * * * *